United States Patent [19]

Schotzko

[11] 4,158,523
[45] Jun. 19, 1979

[54] MITER BOX AND FRAME DOWELING DRILL JIG APPARATUS

[76] Inventor: Jerry J. Schotzko, R.R. #1, Box 112, Rolling Stone, Minn. 55969

[21] Appl. No.: 885,530

[22] Filed: Mar. 13, 1978

[51] Int. Cl.² .................. B23B 47/28; B26D 1/54; B25B 29/00; B25B 1/00
[52] U.S. Cl. .................. 408/115 R; 83/761; 145/129; 269/9
[58] Field of Search .................. 408/115; 83/761, 762, 83/763, 764, 765, 766; 269/9, 10, 88; 145/129

[56] References Cited

U.S. PATENT DOCUMENTS

| 2,273,954 | 2/1942 | Grass | 408/115 |
| 3,583,823 | 6/1971 | Eaton | 408/115 |

FOREIGN PATENT DOCUMENTS

| 91683 | 3/1923 | Austria | 408/115 |
| 959308 | 12/1974 | Canada | 408/115 |
| 2360370 | 4/1978 | France | 408/115 |
| 842251 | 7/1960 | United Kingdom | 408/115 |

Primary Examiner—Harrison L. Hinson
Attorney, Agent, or Firm—Robert D. Farkas

[57] ABSTRACT

A miter box and frame doweling drill jig apparatus utilizes a miter box having the two side walls thereof chamfered at a 45 degree angle relative to the base portion thereof. A plate having a plurality of drill fit aligning holes is removeably affixed at various locations on the chamfered ends of the side walls. A mitered work piece clamped to either side wall may be drilled, utilizing a drill bit aligned in selected holes thereby permitting work pieces to be easily assembled into a picture frame employing dowels therefor.

9 Claims, 2 Drawing Figures

MITER BOX AND FRAME DOWELING DRILL JIG APPARATUS

BACKGROUND OF THE INVENTION

1. The Field of the Invention

This invention relates to miter box and doweling drill jig devices for producing picture frames employing dowel securing devices as well as conventional miter box applications on work pieces.

2. Description of the Prior Art

The prior art abounds with miter boxes adapted for use in positioning work pieces and saw blades in controlled angular relationship to one another. U.S. Pat. No. 534,647 issued Feb. 26, 1895 to T. Harold and U.S. Pat. No. 704,914 issued July 15, 1902 to J. M. J. Phelan and U.S. Pat. No. 2,908,300 issued Oct. 13, 1959 to R. C. Hahn and U.S. Pat. No. 613,189 issued Oct. 25, 1898 to H. L. Cooper each individually teach a miter box wherein the work pieces may be positioned at relative angles to one another alongst their individual longitudinal axes and provide a position in which a saw may be located and maintained in sliding relationship to the apparatus. However, each of the aforementioned devices fail to provide an alignment apparatus useful in positioning a drill jig alongst the location of the edge of a work piece when clamped to the apparatus. Thus, the miter box is inadequate for any purpose save its usefulness as a work piece holding device and a saw guide.

SUMMARY OF THE INVENTION

A primary object of the present invention is to provide a miter box and frame doweling drill jig apparatus useful in all conventional miter box applications and additionally useful in guiding a drill bit into preferred alignment relative to the mitered edge of work pieces such that work pieces may be assembled together utilizing dowels therefor.

Another object of the present invention is to provide a drill alignment device which accommodates work pieces having varied thicknesses and heights.

Still another object of the present invention is to provide a miter box which may handle work pieces of any length yet treat mitered ends thereof by way of drilling holes therein at specified locations.

Yet another object of the present invention is to provide a drill jig device which repeatedly positions a drill jig opening to a work piece relative to the external dimensions thereof with great accuracy.

A further object of the present invention is to provide an inexpensive miter box and drill jig device which may be fabricated from conventional materials at extremely low cost.

Another object of the present invention is to provide a drill jig which may be useful in accommodating a drilling operation of various sized work pieces.

Still another object of the present invention is to provide a work piece alignment and holding apparatus associated with a drill jig which aligns the drill jig holes to each of the eight corners of work pieces which when assembled forms a picture frame.

Yet another object of the present invention is to provide a drill jig attachment for a miter box wherein existing miter boxes may be easily modified to accommodate the use of the drill jig attachment.

Heretofore, miter boxes of the stationary variety, utilized a base portion and a pair of opposed upstanding side wall portions, each having a plurality of slots therein such that a saw blade may be positioned in selected pairs of slots in the walls allowing the cutting edge of the saw blade to be positioned above the base portion of the box at selected angles relative to the longitudinal axis of the trough of the box. The edges of the side walls, extending upwardly from the base portion of the box, were positioned at right angles relative to the plane formed by the uppermost surface of the base of the box. This apparatus was usually fabricated from hardwood so as to resist the wear and tear caused by passing the saw blade through along the length of the slots and so as to prevent the user from cutting deeply into the uppermost lateral surface of the base section of the box. When it was desired to fabricate a picture frame from four work pieces, each having the end thereof mitered at 45 degrees, fastening techniques, such as nailing, doweling, or other fasteners, such as screws or adhesives were employed. In the case where it was desired to utilized dowels, having the ends thereof concealed from view, positioned accurately into the edge surfaces of the mitered edges of the work piece, the user was required to accurately locate a drill bit into such edges such that when adjacent pieces, forming the picture frame, were disposed in touching engagement, the holes adapted to receive the dowels must be in exact alginment. When the work pieces were thin, an extra burden in terms of drill alignment was imposed. Extensive marking of drill starting locations and accurate alignment of the drill bit was required so as to insure that the longitudinal axis of one dowel receiving hole, within one work piece, was positioned in exact coaxial alignment and location, relative to the longitudinal axis of an adjacent hole disposed into the adjacent work piece. If both holes are not exactly aligned and positiond the frame assembled from work pieces carrying misaligned holes would not have the work pieces residing in one plane or still worse, would have such work pieces positioned so as to have the marginal edges of the resulting assembled frame describe a shape other than rectangular.

The present invention recognizes these problems and, more importantly recognizes the need to utilize a conventional miter box in conventional applications whilst allowing such box to be employed as a work piece holding device useful in conjunction with a drill jig apparatus for purposes of providing holes to receive dowels into work pieces that are adapted to construct a four sided rectangular frame having mitered corners. Since work pieces are of varied heights and widths, it is desired to provide a wide variety of drill bit alignment holes to accommodate the spectrum of work pieces expected to be used in the manufacture of mitered picture frames. Furthermore, it is highly desired to have the miter box convertible into conventional miter box use which includes the ability to handle work pieces of indefinite length. By attachment of a drill jig plate to the mitered ends of a three sided miter box and by providing means to reposition such plate into preferred locations thereat wherein the plate may be easily removed, when desired, each of the aforementioned objectives are achieved.

These objects as well as other objects of the present invention will become more readily apparent after reading the following description of the accompanying drawings.

DESCRIPTION OF THE PREFERRED EMBODIMENT

Figure 1:
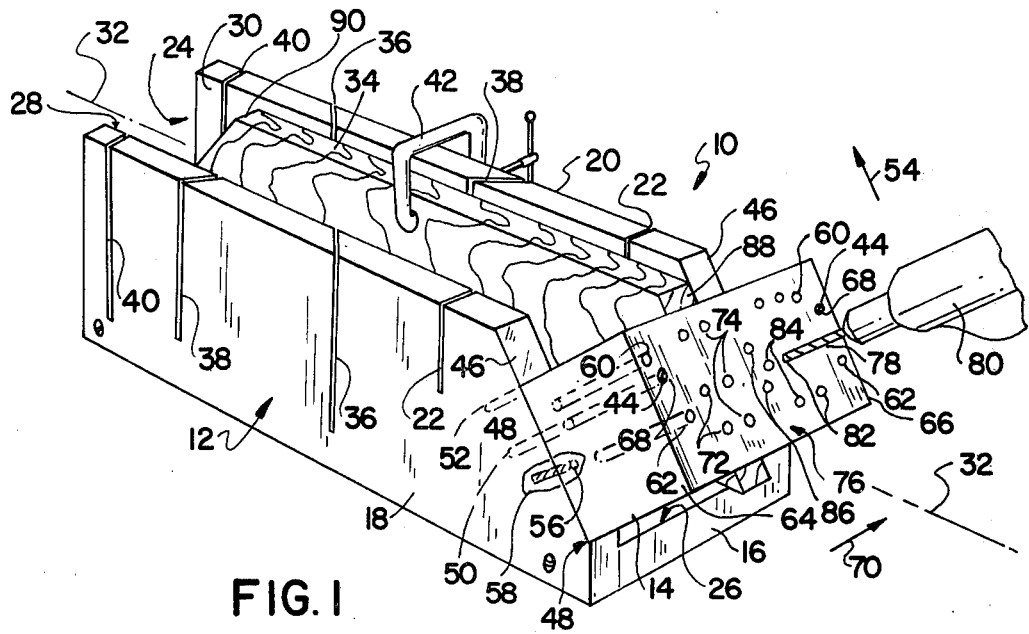
FIG. 1 is a perspective view of the present invention.

The structure and method of fabrication of the present invention is applicable to a miter box having a base planer portions and a pair of parallel opposed upstanding walls secured thereto. Each of the walls have one end thereof, disposed adjacent one another, having mitered or chamfered ends such that both chamfered ends define a plane extending at a selected angle, preferably 45 degrees, relative to the uppermost lateral surface of the base portion of the box. If the apparatus is to be used in fabricating frames having three sides or five or more sides, the angle of the plane aforementioned may be suitably adjusted by having the chamfered edges reside at any angular relationship other than 45 degrees. In the case of a four sided frame apparatus to be manufactured by the present invention, such frame may be joined together by having the work pieces which when assembled comprise the frame, each chamfered at 45 degrees. Such work pieces are first cut to length, each having the ends thereof cut at 45 degrees and in opposite directions so as to define a right angle constructed by extending the planes of the chamfered ends together. When four pieces have been cut, in conventional fashion, utilizing the slots in the miter box walls, the four work pieces are ready for the drilling operation for use in locating dowels into the work pieces useful in joining the work pieces together in aligned relationship. The miter box is provided with slots in the opposed side walls extending transverse to the longitudinal axis of the trough formed by the side walls and the base portion of the box such that the slots are disposed in pair, each being useful in positioning a cutting saw transverse to the longitudinal axis of the box at preferred angular relationship relative thereto. Such pairs of slots are preferably positioned at right angles, and at 45 degree angles relative to the longitudinal axis of the box. Each of the chamfered edges of the side walls are provided with at least one, and preferably two or more threaded holes adapted to receive a fastening device, such as a wood screw therein. Such holes extend along the chamfered edges of the side walls. A plate, having a length equal to the distance separating the external surfaces of the side walls, is utilized having at least a pair of holes located adjacent the ends thereof in which a fastening device, such as a screw may be inserted. Thus, the plate may be secured to the chamfered miter box so as to be located straddling the trough of the box at selected locations relative to the uppermost lateral surface of the base portion of the box. Additional holes, located adjacent the ends of the plate, may be provided such that the plate may be positioned alongst the chamfered edges of the side wall of the box, locating the plate at selected heights relative to the uppermost lateral surface of the base portion of the box. Additionally, the plurality of holes, located adjacent the edges of the plate, may be disposed so as to position the plate at any preferred location, along a line extending transverse to the longitudinal axis of the trough of the box. The plate is also provided with a plurality of holes, each located passing through the opposed lateral surfaces of the plate which are adapted to receive and align a drill bit therein. These holes are preferably disposed along a series of parallel lines each extending transverse to the opposed ends of the plate having the plate fastening holes closest thereto.

In use, the plate is secured to the chamfered edges of the miter box, utilizing fasteners, such as wood screws or bolts therefor, so as to position the plate at a preferred location above the uppermost lateral surface of the base portion of the box and at a preferred location relative to the external surface of one of the side walls of the box. When so positioned, the drill bit jig holes fall into alignment adjacent the interior surfaces of the side walls. A work piece, having an end thereof mitered or chamfered to match the chamfered end of the box is clamped to the side wall of the box, utilizing a C-clamp therefor. A drill machine, of any variety, having a drill bit attached thereto, is utilized by positioning the drill bit into one or more of the drill jig holes disposed adjacent the interior surface of the side wall carrying the work piece clamped thereto. The tip of the drill is caused to enter the chamfered or mitered edge of the work piece to any desired depth. The same work piece, when rotated 180 degrees and reclamped to the same miter box side wall, may be drilled again, utilizing the same drill jig hole as before, so as to place therein at least one hole at opposite ends of the work piece. Other work pieces, used to form the frame, are similarly drilled, utilizing either interior surface of the side walls for clamping and positioning purposes. The frame, assembled from the work pieces, utilizes dowels inserted into the newly drilled holes in the chamfered edges of such work pieces. Since the work pieces have the dowel receiving holes in exact positioned locations, relative to the external surfaces of the work piece, the assembled frame is caused to reside in a flat plane and have the work pieces define a regular shape, such as a rectangle, pentagon, hexagon, or any other polygon. The miter box may be fabricated from hardwoods, utilizing screws or other fasteners to secure together permanently the side walls and the base portion thereof. The plate may be fabricated from a hardwood, if desired, or a metallic material which possesses sufficient hardness so as to withstand repeated aligning operations of rotating drill bits passing therethrough. Further, if desired, the chamfered edges of the miter box may be provided with metallic threaded inserts, capable of withstanding repeated threading therewithin of a threaded fastener, such as a machine bolt, useful in securing the plate to the chamfered edges of the miter box. Holes of various sizes, may be located in the plate, so as to accurately guide drills therein having a range of diameters.

Now referring to the figures, and more particularly to the embodiment illustrated in FIG. 1 showing the present invention 10 employing a miter box 12 and a removeable plate 14 secured thereto. The miter box employs a base portion 16 and opposed side wall portions 18 and 20. Side walls 18 and 20 are provided with slots 22 shown extending across the trough 24 formed by the uppermost lateral surface 26, of base portion 16, and the interior surface 28, of side wall 12, and the interior surface 30, of side wall 20. Dotted lines 32, shown extending in trough 24, and parallel to surfaces 26, 28 and 30, defines the longitudinal axis of trough 24, and of work pieces, such as work piece 34, positioned into trough 24. Slots 22, as shown, extend at right angles to dotted lines 32. Slots 36 and slots 38 extend at 45 degree angles relative to dotted lines 32 and at 90 degree angles relative to each other. Slots 40 extend parallel to slots 22. C-clamp 42 is shown clamping work piece 34 to surface 30. If desired, clamp 42 may removeably secure a work piece, such as work piece 34, to surface 28. Plate 14 utilizes fasteners, shown as screws 44 to removeably secure plate 14 to chamfered edges 46, of side walls 18 and 20. As shown, chamfered edges 46, are disposed forming a 45 degree angle with surface 26. However, edges 46 may define a planer surface residing at any desired angle relative to surface 26. Surface 48, of plate 14, is maintained clamped to edges 46, utilizing screws 44 therefor. Threaded hole 50 receives the end of screw 44, located in side wall 18, and may be threaded therefor. Hole 52, located in chamfered edge 46, is useful in receiving screw 44, when plate 14 is positioned upwardly, in the direction of arrow 54. In like fashion, bolt 44 may have the free end thereof positioned into hole 56, when plate 14 is located downwardly, in a direction opposite to arrow 54. Metallic threaded insert 58 may be utilized in place of holes 50 and 52, if desired, being permanently secured to side wall 18 along the surface formed by chamfered edge 46. In like fashion, the other chamfered edge 46, shown concealed by plate 14, is provided with holes equivalent to holes 50, 52 and 56, each having, if desired, threaded inserts, similar to threaded insert 58. Additional clearance holes 60 and 62 are provided, adjacent ends 64 and 66, of plate 14, for receiving therein screws 44, if desired. Holes 60, are shown spaced apart the same distance as holes 68, shown receiving screws 44 therein. When screws 44 are positioned in holes 60, and have their free ends residing in holes 50, 52 or 56, plate 14 is caused to move in the direction of arrow 70. In like fashion, when holes 62 are utilized to secure plate 14 to box 12, plate 14 is removeably secured to the box in the direction opposite to arrow 70. Thus, it can be seen that plate 14 may be positioned at selected locations relative to surface 26 and surfaces 28 and 30. Holes 72 and 74, are arranged so as to form lines parallel to edges 64 and 66, of plate 14, are located in plate 14 passing between surfaces 76 and 48 thereof, useful in aligning and positioning drill bit 78 of drill machine 80 therein. Holes 82 and 84 are similarly located and extend along lines parallel to ends 64 and 66 of plate 14. Holes 86 are shown located intermediate holes 74 and 84 and also extend between surfaces 48 and 76. Holes 72, 74, 82, 84 and 86 may be of different diameters so as to accommodate different diameter drill bits 78 therein. When work piece 34 is positioned clamped to surface 30, as shown, mitered end 88 thereof is caused to be positioned abutting surface 48. Plate 14 is located so as to have holes 82, 84 or 86 therein to be aligned, as desired, in the center of surface 48. When work piece 34 has surface 88 thereof drilled for receiving dowels, now shown, work piece 34 may be clamped to surface 28, having surface 90 thereof located against surface 48 such that holes 72, 74 or 86 may be utilized to accurately position and align drill bit 78 therein for purposes of drilling other dowel accommodating holes in surface 90. When desired, plate 14 may be removed from edges 46 permitting box 12 to be utilized in conventional miter box application.

Figure 2:
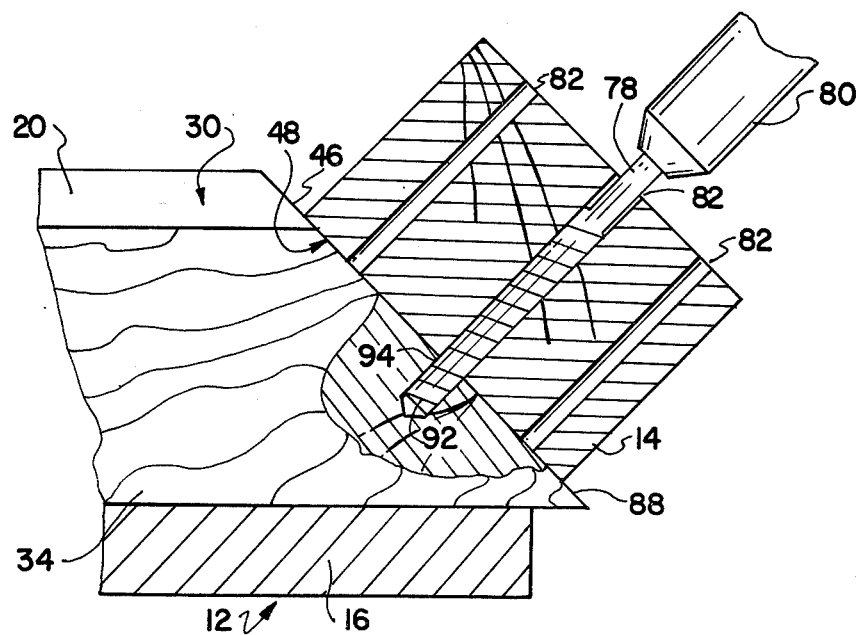
FIG. 2 is a partial side elevational, cross-sectional view, taken along lines 2—2, viewed in the direction of arrows 2—2, of the apparatus shown in FIG. 2.

FIG. 2 illustrates box 12 having base portion 16 to which is secured side wall 20. Work piece 34, shown having mitered edge 88 in contact with surface 48, of plate 14 such that holes 82 are positioned extending at right angles relative to surface 88. Drill bit 78 is shown extending through central hole 82 having the free end 92 thereof shown forming hole 94 in work piece 34. Outer holes 82 may be utilized to align drill bit 78 so as to permit the drill bit to make other holes, not shown, aligned but spaced apart from hole 94, in work piece 34.

One of the advantages of the present invention is a miter box and frame doweling drill jig apparatus useful in all conventional miter box applications and additionally useful in guiding a drill bit into preferred alignment relative to the mitered edge of work pieces such that work pieces may be assembled together utilizing dowels therefor.

Another advantage of the present invention is a drill alignment device which accommodates work pieces having varied thicknesses and heights.

Still another advantage of the present invention is a miter box which may handle work pieces of any length yet treat mitered ends thereof by way of drilling holes therein at specified locations.

Yet another advantage of the present invention is a drill jig device which repeatedly positions a drill jig opening to a work piece relative to the external dimensions thereof with great accuracy.

A further advantage of the present invention is an inexpensive miter box and drill jig device which may be fabricated from conventional materials at extremely low cost.

Another advantage of the present invention is a drill jig which may be useful in accommodating a drilling operation of various sized work pieces.

Still another advantage of the present invention is a work piece alignment and holding apparatus associated with a drill jig which aligns the drill jig holes to each of the eight corners of work pieces which when assembled forms a picture frame.

Yet another advantage of the present invention is a drill jig attachment for a miter box wherein existing miter boxes may be easily modified to accommodate the use of the drill jig attachment.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A miter box and frame doweling drill jig apparatus comprising a miter box having a base portion and a pair of side wall portions, said side wall portions being secured to said base portion and upstanding from an uppermost lateral surface of said base portion, each of said side walls being located in spaced apart parallel relationship having opposed interior surfaces, the end of each of said side walls being located adjacent one another being chamfered defining parallel chamfered edges, a plate, means to removeably secure said plate to said chamfered edges at selected locations therealong, said plate having a plurality of holes therein whereby each of said plurality of holes extend transverse to said chamfered edges when said plate is secured to said chamfered edges.

2. The apparatus as claimed in claim 1 wherein said means to removeably secure comprises another plurality of holes located in said plate, at least one elongated screw, at least one threaded hole located in each of said chamfered edges, whereby said screw passes through one of said additional holes and threadingly engages said at least one threaded hole thereby clampingly engaging said plate to said chamfered edges.

3. The apparatus as claimed in claim 2 further comprising a metallic insert, said metallic insert having a threaded hole therein, said metallic insert being fixedly secured to said side walls locating the threaded hole thereof in said chamfered edges whereby said elongated screw may be threadingly engaged in said threaded hole of said metallic insert.

4. The apparatus as claimed in claim 2 whereby said additional plurality of holes are located so as to permit said plate to be secured to said chamfered edges at selected locations whereby said plate is located along a line extending upwardly from said uppermost lateral surface of said base.

5. The apparatus as claimed in claim 2 whereby said additional plurality of holes are located so as to permit said plate to be secured to said chamfered edges at selected locations whereby said plate is located along a line extending parallel to said uppermost lateral surface of said base.

6. The apparatus as claimed in claim 1 wherein said base and said side walls are hardwood.

7. The apparatus as claimed in claim 1 wherein said plate is hardwood.

8. The apparatus as claimed in claim 1 wherein said chamfered edges define a 45 degree angle relative to said uppermost lateral surface of said base.

9. The apparatus as claimed in claim 1 wherein each of said plurality of holes have different diameters.

* * * * *